United States Patent [19]

Brockington et al.

[11] Patent Number: 4,539,248

[45] Date of Patent: Sep. 3, 1985

[54] REINFORCED FILAMENT TAPE

[75] Inventors: F. Rhett Brockington; William Z. Foster, both of Richland County, S.C.

[73] Assignee: Anchor Continental, Richland, S.C.

[21] Appl. No.: 651,863

[22] Filed: Sep. 18, 1984

[51] Int. Cl.³ .......................... B32B 5/02; B32B 27/04
[52] U.S. Cl. .................................. 428/161; 427/207.1; 427/208.8; 428/213; 428/294; 428/343; 428/352; 428/354
[58] Field of Search ............... 428/294, 295, 343, 352, 428/354; 24/16 PB; 427/207.1, 208.8

[56] References Cited

U.S. PATENT DOCUMENTS 2,744,041  5/1956  Balchen ........................ 428/294
2,750,316  6/1956  Bemmels ....................... 428/295

Primary Examiner—Paul J. Thibodeau
Attorney, Agent, or Firm—John J. Byrne; Kevin M. O'Brien; Bradford E. Kile

[57] ABSTRACT

A reinforced filament tape for securing and releasing meeting edges of a container or articles within a container, comprises a flexible backing ribbon with a pressure sensitive adhesive on one side. On the other side of the backing ribbon is a binding layer overlayed by a plurality of reinforcing filaments and a releasing layer. The filaments are contacted with a filament coating and remain securely positioned in the binding layer.

17 Claims, 7 Drawing Figures

REINFORCED FILAMENT TAPE

BACKGROUND OF THE INVENTION

This invention relates to an improved reinforced filament tape. More particularly, this invention relates to a reinforced filament tape having a high tensile strength and requiring a reduced amount of adhesive material.

A threshold of common demoninator of almost all pressure senstive adhesive tapes is the function of providing adequate strength when in use as a fastening means. To this end, tapes have commonly assumed a form in which a layer of pressure sensitive adhesive is applied to one surface of a backing member. A wide variety of mateials have been used as backing members for tapes such as paper, cloth, and plastic film. Also, various kinds of pressure sensitive adhesive materials have been developed over the years. Some of the more commonly known adhesive materials are natural rubbers, butadiene-styrene and substituted styrene copolymers, poylchloroprene, polyisbotylene and butadiene/acrylonitrile materials.

In certain instances, it has been found desirable to provide a reinforced filament tape which requires a relatively small amount of pressure sensitive adhesive material. Adhesive materials are often expensive, and a reduced amount of adhesive material contributes to a decreased overall cost of the production of the tape. Also, the time required for the adhesive material to dry after application to the backing layer is related to the thickness of the adhesive layer so that a relatively thin film of adhesive increases the speed with which the tape can be produced.

The specialty tape industry has still another important reason for desiring a tape which requires a relatively thin layer of adhesive material. In the appliance industry it is not unusual for items such as refrigerators, ovens, and the like to be shipped and stored with component parts fixed in place within the appliance by means of reinforced tape. These component parts may include trays, drawers, racks, etc. It has been found that tapes having a relatively thick adhesive layer frequently emit offensive odors as components of the adhesive tape volatilize. Thus, it is not uncommon for a refrigerator or other appliance within which a tape having a thick adhesive layer has been used to have an objectionable odor after transport and storage, and this odor may be transferred to food items placed into the appliance during the initial use by the consumer.

Further significant problems occasioned by the tape industry involve the handling and manipulation of reinforced filament tapes. Reinforced filaments generally provide increased strength to the tape and may comprise materials such as Fiberglas®, Nylon®, Rayon®, polyester and the like. These filaments generally extend over the backing layer in a random mat or a spaced parallel arrangement either on an adhesive side or on a release layer side of a backing layer. It has been determined that when the reinforced filaments are placed on the adhesive layer side of the backing material, a substantially greater amount of adhesive material is required for suitable performance because the adhesive material must cover not only the reinforcing filaments and the interstices between the filaments but also be thick enough to form a secure bonding surface. As noted above, however, the use of an increased amount of adhesive material is costly, results in a longer drying time for the tape, and results in a tape which emits a relatively strong offensive odor.

Another problem associated with reinforced filament tapes in which the reinforcing filaments are positioned on the adhesive side of the tape is the relatively large degree of delamination which occurs upon unreeling of the tape or upon removal of the tape from a container. If delamination occurs during unreeling, the tape must be cut, the unreeled portion thrown away and a new section unreeled. If delamination occurs during use wherein a portion of the reinforcing strands and adhesive remain on the container surface upon removal of the backing layer, an additional procedure such as scraping or cutting must be performed before the container can be cleanly opened.

An advance in the reinforced filament tape art occurred in the relatively recent past when it was determined that reinforcing filaments could be positioned on the side of the backing layer opposite the adhesive material. In this construction, reinforcing filaments are held in place by a bonding coat which is then overlayed by a release coat of different material so that the tape can be wound upon and dispensed from a spool. Alternatively, the same material can serve as a bonding coat and a release coat.

While reinforcing tape designs such such as noted above, have achieved at least a degree of industry recognition and utilization, room for significant improvement remains. In this regard, several problems have been associated with reinforced filament tapes of the prior art in which the filaments are positioned on the side of the backing layer opposite the adhesive material. These filaments commonly splinter or otherwise become dislodged from the binding layer of the tape which weakens the tpae and, if sufficiently serious, can destroy the usefulness of the tape. Also, tapes disclosed in the prior art are generally covered by an even coat of release material which given the tape a smooth outer surface. This surface is extremely difficult to write on with a pen or pencil and is a handicap to workers in the industry who often desire to leave messages or identifying marks without writing on the container itself.

A further significant disadvantage of prior fiber reinforced tapes has been that these tapes have commonly been very difficult if not impossible to separate or sever without the use of a cutting instrument such as a scissors or knife. The absence of a tape which is severable by hand is burdensome in that a user is required to maintain a cutting tool at a work site.

The problems suggested in the proceeding are not intended to be exhaustive but rather are among many which may tend to reduce the effectiveness of prior fiber reinforced tapes. Other noteworthy problems may also exist, however, those presented above should be sufficient to demonstrate that the fiber reinforced tapes appearing in the prior art have not been altogether satisfactory.

OBJECTS AND SUMMARY OF THE INVENTION

Objects

It is, therefore, a general object of the invention to provide a reinforced filament tape which will obviate or minimize the problems of the type previously described.

It is a particular object of the invention to provide a reinforced filament tape which requires a reduced amount of pressure sensitive adhesive for effective performance.

It is another object of the invention to provide a reinforced filament tape which requires a reduced drying time for the adhesive material and which emits a reduced amount of malordorous odoriferous compounds after drying.

It is yet another object of the invention to provide a reinforced filament tape which reduces or eliminates delamination upon unreeling or upon renmoval of the tape from a container surface.

It is still another object of the invention to provide a reinforced filament tape which reduces or minimizes splintering of the fiber strands within the tape.

It is a further object of the invention to provide a reinforced filament tape which may be faciley marked with a pen, pencil or the like.

It is yet a further object of the invention to provide a reinforced filament tape which may be easily torn by hand without the use of a knife or scissors or other cutting instrument.

BRIEF SUMMARY OF THE INVENTION

One preferred embodiment of the invention which is intended to accomplish at least some of the foregoing objects comprises a reinforced filament tape made up of an a ribbon flexible backing layer, an adhesive layer, a binding layer, a plurality of spaced parallel reinforcing filament and a releasing layer. The adhesive layer overlays and is co-extensive with a first planar surface of the backing layer. A binding layer overlays the second planar surface of the backing layer. Reinforcing filaments overlay the binding layer. The reinforcing filaments are contacted with a filament coating to prevent the filaments from splintering or otherwise separating from the binding layer during use. A releasing layer then preferably overlays at least an outer raised portion of the reinforcing filaments.

In a specific embodiment of the invention, the reinforced filament tape additionally comprises a continuous layer of filament coating which overlays the filaments and is positioned between the filaments and the releasing layer.

In another embodiment, the filament coating material and the releasing layer material are composed of the same material.

This invention is described herein with reference to the shipping and storage of appliances. It should be understood, however, that the present invention may be used in connection with containers constructed of various materials, such as metal, wood, cardboard, paper and the like for a wide variety of purposes.

THE DRAWINGS

Other objects and advantages of the present invention will become apparent from the following detailed description of preferred embodiments taken in conjunction with the accompanying drawings, wherein.

DETAILED DESCRIPTION

Figure 1:
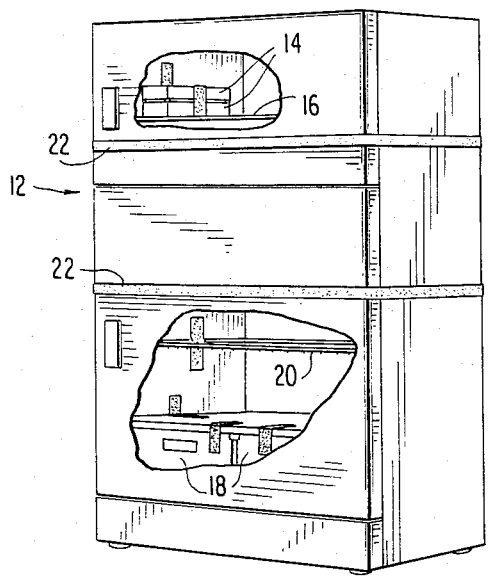
FIG. 1 is an axonometric view of a container such as a refrigerator wherein an improved reinforced filament tape in accordance with the present invention has been applied to secure component parts for shipment and storage.

Referring now to the drawings, wherein like numerals indicate like parts, FIG. 1 illustratively discloses an operative environment of the invention. In this regard, a conventional refrigerator 12 having component parts which include ice cube trays 14 on racks 16, food storage drawers 18, and shelf 20. During shipment and storage, the component parts are anchored within the refrigerator by means of reinforced filament tape 22, and the door and freezer panels may also be taped shut. As discussed previously, in tapes constructed in accordance with the prior art, volatile and offensive compounds were emitted, particularly from the adhesive layer. Thus when the door of the appliance was opened there would be an unpleasant tape odor inside the appliance which was unappealing to the consumer and difficult to eliminate. One of the advantages of the tape of the present invention is that a reduced amount of adhesive material is required which reduces or eliminates odors caused by volatile compounds.

In one preferred embodiment of the invention (note FIGS. 2-4), the reinforced filament tape comprises a flexible ribbon or backing layer 30, a pressure-sensitive adhesive layer 32 on one side of the planar surface of the backing layer, a binding layer 34 overlaying the other planar surface of the backing layer, a plurality of spaced mutually parallel filaments 36 overlaying the binding layer, and a releasing layer 38 overlaying the filaments.

Figure 5:
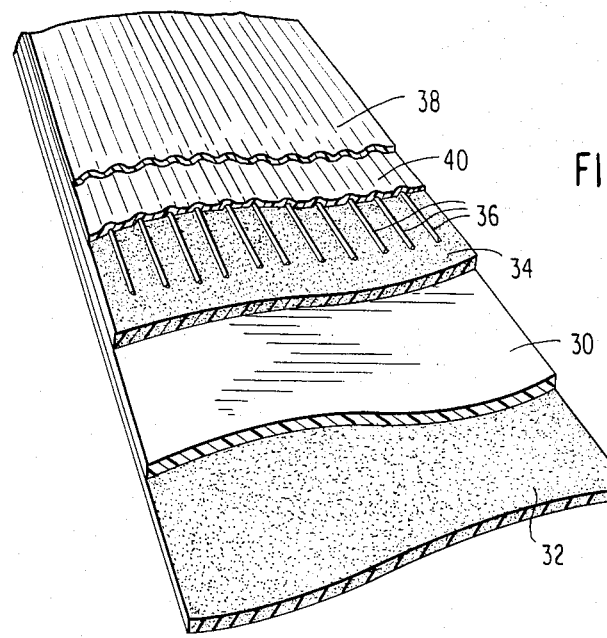
FIG. 5 is an axonometric view, similar to FIG. 2, of another preferred embodiment of the subject invention disclosing a reinforced filament tape with an additional layer of carbonaceous anti-splintering material overlaying the reinforcing beams and underlaying the releasing layer.
Figure 6:
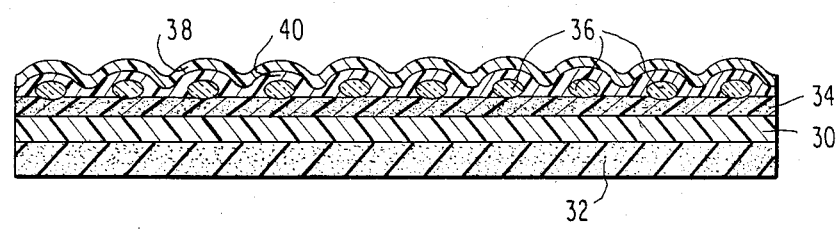
FIG. 6 is a front view of the reinforced filament tape shown in FIG. 5.
Figure 7:
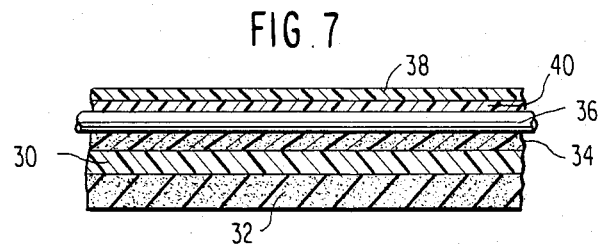
FIG. 7 is a side view of the reinforced filament tape shown in FIG. 6.

In an alternate preferred embodiment of the invention, shown in FIGS. 5-7, the reinforced filament tape additionally comprises a continuous layer of filament coating material 40 overlaying the filaments 36 and underlaying the releasing layer 38.

The backing ribbon 30 of the present invention may comprise a wide variety of materials known in the industry such as polyester films, polyethylene films, ethylcellulose films, cellulose acetate, cellulose acetate butyrate, polyvinylidene polymers and copolymers, vinyl chloride polymers such as vinyl chloride and vinyl acetate, polyfuorethylenes such as polytetrafluorethylene and polytrifluorchloroethylene, polyamides of the nylon type, flexible glass films, papers, such as kraft paper, and the like. A preferred backing material for use in the subject invention is a polyester film known as Mylar and manufactured by E. I. DuPont D. Nemours, and Company.

A pressure sensitive adhesive material 32 is applied to one side of the planar surface of the backing ribbon 30. Among the materials which may be used to form the adhesive layer are natural and synthetic latexes comprising styrenebutadiene copolymers, acrylic resins, polyvinyl acetate, and similar materials. A preferred adhesive material for use in the subject invention is a natural rubber adhesive.

Unlike numerous tapes of the prior art, the reinforcing filaments 36 are not bound to the tape ribbon by means of the adhesive contact layer of the tape. Accordingly, the adhesive material of the present invention need not cover both the reinforcing strands and the interstices between the strands but may be applied as a relatively thin, flat continuous film. The flat adhesive film requires less overall adhesive material than prior art tapes wherein the reinforcing filaments are located in the adhesive layer. As noted previously, the reduction in the amount of adhesive material reduces the overall cost of the process, increases the speed with which the adhesive material may be dried, and reduces or eliminates offensive odors emitted by the tape.

Overlaying the other planar surface of tape ribbon 30 is binding layer 34. The binding layer is a tacky, elastic coating which is generally applied to the backing layer prior to contact with the reinforcing filaments. The elastic nature of the binding layer permits some freedom of movement of the filaments which may be necessary for the filaments to maintain tensile strength. The binding layer is preferably applied in a relatively thin coat, for example, in the amount of 12–15 pound per 5,000 feet of tape, and is dried just prior to contact with the reinforcing filaments. Such operation allows faster line speeds because the fibers do not inhibit drying of the binding layer.

Suitable materials for use as the binding layer in the present invention include latex adhesives and acrylic emulsion adhesives. A preferred binding layer material includes a high sheer acylic emulsion.

Overlaying the tacky elastic binding layer 34 are a plurality of spaced, mutually parallel reinforcing filaments 36. The filaments may be glass or synthetic material. A preferred filament comprises Fiberglas, manufactured by Owens-Corning Fiberglas Corp., and has approximately 200 strands per filament with a 0.36 mil. diameter. Of course, it should be understood that other materials can be used such as cellulose acetate, nylon, cotton, silk, polyester, and the like, though not necessarily with equivalent results. The overall tensile strength of the composite tape largely depends on the filament material, the number of strands per filament, and the number of filaments per inch of tape width. In this regard, the number of filaments may range from as few as ten filaments per inch of tape width to as many as 200 filaments per tape width, depending upon the intended use of the tape.

Fiber reinforced tapes of the prior art often suffered from the tendency to splinter and otherwise become dislodged from the composite tape during use. As part of the present invention, the reinforcing filaments are contacted with a filament coating to reduce or eliminate splintering and dislodgement from the binding layer. The filament coating material should have a low viscosity and surface tension so as to penetrate and preferably saturate the reinforcing filaments in a relatively short period of time. Polar solvents such as methanol, isopropanol and ethanol when admixed with toluene or xylene are desirable over molten resins such as polyethylene or polypropylene due to the speed of coating. A preferred mixture of filament coating material is a toluene-isopropanol-polyamide mixture or an aqueous solution of acrylic acid-ethylene copolymer.

The filament coating material of the present invention can also be used to alter the elastic qualities of the tape. Hard resinous coatings such as unplasticized polyvinyl acetate, methylmethacrylates, styrenics such as polystyrene, and acrylic acids stiffen the tape. Sufficient quantities of these coatings provide a tape which is relatively easy to break by a reverse bend and laterally tear by hand without the need of a cutting tool such as a scissors or knife. This is in sharp contrast to tapes of the prior art, which require a cutting tool to break fiber reinforced tapes. Alternatively, softer anti-splintering carbonaceous material such as natural and synthetic rubber can be used to enhance the flexibilitiy of the composite tape. A particularly preferred filament coating is a styrene-butadiene block copolymer because this coating bonds well to both the binding layer and the releasing layer and is sufficiently flexible to allow the tape to bend but sufficiently brittle to permit lateral tearing after a reverse bend.

Figure 2:
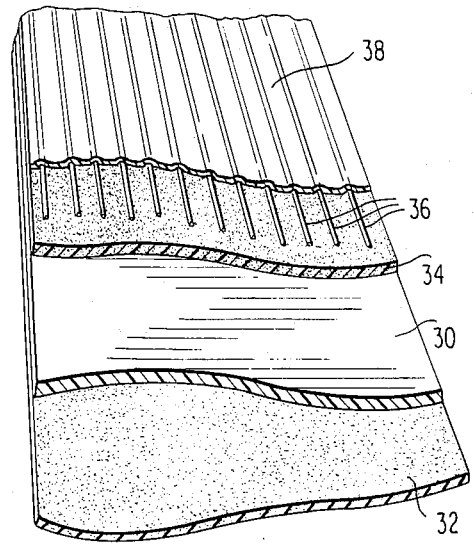
FIG. 2 is an axonometric view of the subject reinforced filament tape which has been broken away in layers to disclose the composition of the various courses which make up the reinforced filament tape and further illustrating individual reinforcing filaments within the tape.
Figure 3:
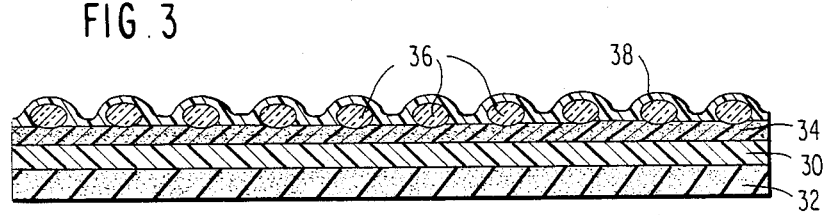
FIG. 3 is a front view of the reinforced filament tape shown in FIG. 2.
Figure 4:
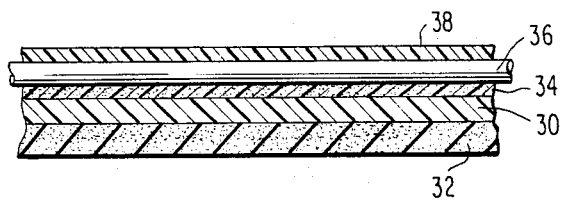
FIG. 4 is a side view of the reinforced filament tape shown in FIG. 2.

As shown in FIGS. 2–4, in the present invention releasing layer 38 overlays the reinforcing filament 36. The releasing layer can be composed of paraffinics, octadecane-polyvinyl alcohol polymers, silicon polymers and copolymers of polyesters and polyamides. In one embodiment of this invention, the releasing layer serves also as the filament coating material.

In another embodiment best seen in FIG. 5, the filament coating may also be applied to the present invention in the form of a continuous layer 40 underlaying the release coat. As noted above, addition of a resinous filament coating will stiffen the tape making it relatively easy to break and tear whereas addition of softer coatings such as plasticized polyvinyl acetate will make the tape more flexible. Generally, to insure sufficient penetration of the filament coating, tapes with over thirty filaments per inch will require application of a separate filament coating. Tapes with a lower filament count, however, may be prepared with a release coat serving as both a filament coating and a releasing layer, although a separate filament coating layer could also be used.

As best seen in FIGS. 3 and 6, the outside surface of the tape of the present invention is contoured to the shape of the reinforcing filaments. In contrast to the flat outer surfaces of the tapes of the prior art, the furrowed outer surface of the tape of the present invention resulting from the placement of the filaments on the non-adhesive side of the backing layer is easily marked by pencil which is a significant advantage to workers in the industry who frequently desire to leave identifying marks, messages, etc. without marking the container itself. Similarly, the materials used in the construction of the present invention are more easily marked by pen than prior tapes. In this regard, the absence of a mark resistant outer surface in the present invention such as Mylar is also significant. Still further advantages of the present invention resulting from the location of the filaments outside of the Mylar backing layer is that the tape has a substantially reduced surface glare and improved readability. Furthermore, because the reinforcing filaments are insulated by the backing layer, the potential for delamination of the tape occurring on removal from a surface or unreeling is substantially eliminated.

FIGS. 4 and 7 present a side view of the tape shown in section in FIGS. 2 and 5, and illustrate a preferred embodiment of the invention wherein the diameter of the reinforcing filaments exceeds the thickness of the overlaying material. The overlaying material may be either the release coat or the release coat and a continuous layer of filament coating. This configuration insures that the resultant structure will have a furrowed outer surface reflecting the shape of the reinforcing filaments.

The following examples illustrate particular embodiments of the invention generally described above and should not be considered as limiting the scope of the present invention. EXAMPLE 1

A Mylar film ribbon was first coated with a high sheer acrylic emulsion binding layer in an amount of 0.4 grams per square foot. Fiberglas filaments were then applied to the binding layer in the amount of 32 filaments per inch of tape width. A thermoplastic polyamide cured with an epoxy and having a softening point of 105° to 115° C. and a viscosity at 160° C. to 12 to 18 centipoise was then applied to the tape composite in an amount of 0.5 grams per square foot to serve as both the filament coating and a release layer. A natural rubber resin adhesive was then applied to the oppsite side of the Mylar film in an amount from 2.5 to 4.25 grams per square foot. The total thickness of the resultant tape was 6.5 to 7.5 mils., and the tape had a tensile strength of 200 pounds per inch. Also, the tape was easily broken by hand by bending the tape back beam to beam thereby cracking the filaments before laterally tearing the tape in two by hand.

EXAMPLE 2

Similar materials were used in this example as were used in example 1. However, in this example the Mylar film had a thickness of 1.4 mils, the binding layer was applied in an amount of 0.6 grams per square foot, the fiberglas filaments were applied in the amount of 60 filaments per inch of tape width, the release coat was applied in an amount of 0.3 grams per square foot and the adhesive was applied in the amount of 4.2 grams per square foot. Additionally, a filament coating comprising an aqueous solution of an acrylic acid-ethylene copolymer available from B. F. Goodrich under the name of Carboset was applied in a continuous layer over the fiberglas filaments and underlaying the release layer in the amount of 0.9 grams per square foot. The resultant tape had a thickness of 9 to 9.5 mils with a tensile strength of over 400 pounds per square inch.

Having described in detail a preferred embodiment of the invention and before continuing with the claim portion of this specification, it may be useful to briefly set forth some of the major advantages of the invention.

SUMMARY OF MAJOR ADVANTAGES OF THE INVENTION

In describing a reinforced filament tape in accordance with preferred embodiments of the invention, those skilled in the art will recognize several advantages which singularly distinguish the subject invention from the heretofore known prior art.

Without attempting to set forth all of the novel features of the invention, as specifically and inherently set forth above, it will be noted that prior reinforced filament tapes have frequently located the reinforcing filaments between the adhesive and the backing layer. This configuration requires an increased amount of adhesive material resulting in relatively high cost and drying time. Moreover, the increased adhesive material which is used with these tapes emits a relatively large quantity of offensive volatile compounds when in use. Furthermore, tapes of this construction experience significant delamination upon removal from the container surface.

Previously known tapes in which the reinforcing fiber beams have been located on the opposite side of the backing surface from the adhesive material also have presented serious disadvantages. As with those tapes in which the reinforcing fiber beams are located within the adhesive material, these tapes have included no filament coating to prevent the reinforcing filaments from fracturing and losing strength or otherwise dislodging from the tape composite. Moreover, the outer surfaces of these tapes have been relatively flat, making the tapes difficult if not impossible to write on. Furthermore, reinforced filament tapes have generally been extremely difficult to separate without the aid of a cutting instrument such as a knife or scissors.

In contrast to fiber reinforced tapes of the prior art, the present invention reduces or eliminates the difficulties associated with the use of large amounts of adhesive material. The invention provides a relatively thin and flat adhesive layer to be applied to the backing layer requiring no excess adhesive for filling interstices between reinforcing filaments. The unique configuration of the present invention also provides a reinforced filament tape which reduces or eliminates delamination upon removal from a container surface, is easily printed upon with a pen or pencil, cuts down surface glare from the Mylar backing film thereby improving readibilitry, reduces instances of filament fracture and dislodgement from the tape composite, and may be produced to be easily breakable by hand and without the use of a cutting instrument. Moreover, the rough outer surface of the fiber beam tape of the instant invention facilitates unreeling of a roll of tape in that only the crests of the filament contact the pressure sensitive adhesive of the opposite side of the tape on a roll.

In describing the present invention, reference has been made to preferred embodiments. Those skilled in the art, however, and familiar with the disclosure of the subject invention will recognize that additions, deletions, substitutions, and/or changes may be made which will fall within the perview of the invention as defined in the following claims.

What we claim is:

1. A reinforced filament tape comprising:
   an elongate flexible backing ribbon having first and second mutually parallel planar surfaces;
   an adhesive layer overlaying and co-extensive with said first planar surface;
   a binding layer overlaying and co-extensive with said second planar surface;
   a plurality of spaced mutually parallel reinforcing fiber filaments overlaying said binding layer, said fiber filaments being contacted and penetrated with a filament coating to prevent said fiber filaments from separating from said binding layer; and
   a releasing layer overlaying and contoured to the shape of said filaments for facilitating unreeling of said reinforced filament tape.

2. A reinforced filament tape as defined in claim 1 wherein:
   said reinforcing filaments are contacted with a hard resinous filament coating to permit said filaments to be cracked by bending the tape upon itself to facilitate lateral tearing of the tape.

3. A reinforced filament tape as defined in claims 1 or 2 wherein:

said filaments are saturated with said filament coating.

4. A reinforced filament tape as defined in claimn 1 wherein:
said tape additionally comprises a continuous layer of said filament coating between said reinforcing fiber filaments and said releasing layer.

5. A reinforced filament tape as defined in claim 1 wherein:
the diameter of each of said filament is greater than the thickness of said releasing layer.

6. A reinforced filament tape as defined in claim 4 wherein:
the diameter of each of said filament is greater than the combined thickness of said releasing layer and said continuous layer of said filament coating.

7. A reinforced filament tape as defined in claims 1 or 4 wherein:
said adhesive layer material is selected from the group consisting of butadiene-styrene copolymers, butadiene-acrylonitrile polymers and natural rubbers.

8. A reinforced filament tape as defined in claims 1 or 4 wherein:
said adhesive layer comprises a butadiene-styrene copolymer.

9. A reinforced filament tape as define in claims 1 or 4 wherein:
said binding layer material is selected from the group consisting of latex adhesives and acrylic emulsion adhesives.

10. A reinforced filament tape as defined in claims 1 or 4 wherein:
said binding layer material comprises a high sheer acrylic emulsion.

11. A reinforced filament tape as defined in claims 1 or 4 wherein:
said filaments are selected from the group consisting of glass fibers and polyester fibers.

12. A reinforced filament tape as defined in claims 1 or 4 wherein:
said filaments comprise glass fiber.

13. A reinforced filament tape as defined in claims 1 or 4 wherein:
said filament coating is selected from the group consisting of nonaromatic polar solvents, aromatic polar solvents, mixtures of aromatic and nonaromatic polar solvents, and molten resins.

14. A reinforced filament tape as defined in claims 1 or 4 wherein:
said filament coating is applied to said filament in the form of an isopropanol, toluene polyamide solution.

15. A reinforced filament tape as defined in claims 1 or 4 wherein:
said filament coating is applied to said filament in the form of an aqueous solution of acrylic acid-ethylene copolymer.

16. A reinforced filament tape as defined in claims 1 or 4 wherein:
said releasing layer material is selected from the group consisting of paraffinics, octadecane-polyvinyl alcohol polymers, silicone polymers and copolymers, polyesters and polyamides.

17. A reinforced filament tape as defined in claims 1 or 4 wherein:
said releasing layer material is a polyamide.

* * * * *